(12) United States Patent  (10) Patent No.: US 7,975,810 B2
Liu et al.  (45) Date of Patent: Jul. 12, 2011

(54) CAM ACTIVATED BICYCLE WHEEL BRAKE

(76) Inventors: Robert Z. Liu, Taichung (TW); Robert L. Barnett, Santa Ana, CA (US)

( * ) Notice: Subject to any disclaimer, the term of this patent is extended or adjusted under 35 U.S.C. 154(b) by 505 days.

(21) Appl. No.: 12/011,775

(22) Filed: Jan. 28, 2008

(65) Prior Publication Data

US 2009/0038894 A1   Feb. 12, 2009

(51) Int. Cl.
*B62L 3/00*   (2006.01)
(52) U.S. Cl. .................... 188/24.22; 188/24.12
(58) Field of Classification Search .... 188/24.11–24.22, 188/25, 26
See application file for complete search history.

(56) References Cited

U.S. PATENT DOCUMENTS

3,628,635 A   12/1971   Yoshigai ................ 188/26
7,000,739 B2   2/2006   Ciamillo ............. 188/24.22

*Primary Examiner* — Melanie Torres Williams
(74) *Attorney, Agent, or Firm* — Weide & Miller, Ltd.

(57) ABSTRACT

A wheel brake for a bicycle or other vehicle has a pair of pivoting arms. Each arm is configured to support a brake pad. A first arm pivotally supports a cam. A second arm defines a cam surface and a cable guide. The cam has a first end for mounting of a cable and a second end having a roller which rests on the cam surface. When the cable is actuated, the cable pulls the first end of the cam, causing the cam to pivot and causing the second end of the cam to roll along the cam surface. Force applied by the cam compresses the arms, causing associated brake pads to move inwardly into engagement with the wheel. The brake is compact and efficient in design.

20 Claims, 5 Drawing Sheets

CAM ACTIVATED BICYCLE WHEEL BRAKE

FIELD OF THE INVENTION

The present invention relates to a braking mechanism for a bicycle wheel.

BACKGROUND OF THE INVENTION

A variety of brakes have been proposed for bicycles. These brakes include chain brakes, hub-mounted disc brakes, and the rim brake, among others. In general, rim brakes utilize one or more pads to press against the outer surface of the wheel rim adjacent the tire in order to generate a braking force.

Prior rim brakes suffer from a number of drawbacks. First, it is desirable for the brake to be lightweight. Some brakes are very effective, but extremely heavy. Second, the brake must be reliable and effective in operation. For example, some brakes are relatively lightweight but suffer from one or more disadvantages, such as requiring a high user application force or having an uneven braking action or poor braking force.

For example, U.S. Pat. No. 3,628,635 discloses a side-pull lever rim-type brake. As disclosed, the brake is constructed so that "a small tensile force can achieve a big brake effect." On the other hand, this brake design suffers from several drawbacks. First, the configuration of the brake makes the brake large in dimension. When the brake is activated, the lever arm (16) thereof rotates upwardly and outwardly. In this position, the arm (16) protrudes outwardly from the brake and may pose a hazard, such as to the body of a rider. In addition, while a large lever action is created, braking effect can not be well controlled or adjusted, as the braking force is applied to the far side of one of the arch members.

U.S. Pat. No. 7,000,739 discloses a later attempt to create a compact and efficient brake. This brake uses a cam-type lever (52). The lever (52) is mounted to one arm (14) for pivoting, and engages a second arm (12). Movement of the lever presses the two arms (and brae shoes thereon) towards one another. This design is an improvement over the above-described brake in that this brake is more compact. Yet, the design still requires a long lever arm in order to effect sufficient braking (which adds weight to the brake and limits the compactness of the brake).

SUMMARY OF THE INVENTION

One aspect of the invention is a wheel brake for a bicycle or other vehicle.

In general, in one embodiment, the brake has a pair of pivoting arms. Each arm is configured to support a brake pad. A first arm pivotally supports a cam or actuating lever. A second arm defines a cam surface and a cable guide. The cam has a first end for mounting of a cable and a second end which engages the cam surface. When the cable is actuated, the cable pulls the first end of the cam, causing the cam to pivot and causing the second end of the cam to press upon the cam surface. Force applied by the cam compresses the arms, causing the associated brake pads to move inwardly into engagement with the wheel.

In one embodiment, the first arm has a first end, an opposing second end and a pivot point there between. A brake pad is mounted at the first end and the cam is mounted to the second end. The second arm similarly has a first end, an opposing second end and a pivot point. A brake pad is mounted at the first end and in one embodiment, the pivot point is located at the second end.

In one embodiment, a roller is mounted at the second end of the cam. The roller is configured to roll on the cam surface of the second arm. The cam surface preferably comprises an outer, top surface of the second arm.

The cam is pivotally mounted at a point between the first and second ends of the cam. In the preferred configuration, the pivot point of the cam is between the cable mount and roller of the cam.

The brake of the invention is compact and lightweight in design. The brake maximizes braking effect and can be customized to generate linear or progressive braking action.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a brake mechanism and, more particularly, a wheel brake. The invention has particular application to the wheel of a bicycle or similar apparatus or vehicle (unicycle, tricycle, etc.).

In general, the brake of the invention comprises a pair of arms configured to support brake pads for engaging a wheel. The arms are actuated by a cam. The cam may be actuated by a cable or similar device.

One embodiment of the invention will be described first with reference to FIG. 1. As illustrated therein, a brake or brake mechanism or device 20 comprises a first arm 22, a second arm 24, and a cam or lever 26. The first and second arms 22,24 are pivotally mounted to a support 28. Each arm 22,24 is configured to support a brake pad 30,32. The cam 26 includes a cable mount 34 for an actuating cable (not shown). The cable preferably passes through a cable adjuster 36 supported by the second arm 24.

In use, as described in more detail below, the support 28 is connected to a supporting structure such as the frame of a bicycle. The brake 20 is oriented so that the brake pads 30,32 are positioned adjacent opposing sides of a rim of a wheel, such as a bicycle wheel. In operation, the cable is actuated (such as via a brake lever, not shown). Activation of the cable causes an outer end of the cam 26 to move upwardly and thus an actuating end of the cam downwardly, thus forcing the two arms 22,24 towards one another. This causes the brake pads 30,32 to move inwardly to contact the wheel, thus effecting a braking force.

Figure 2:
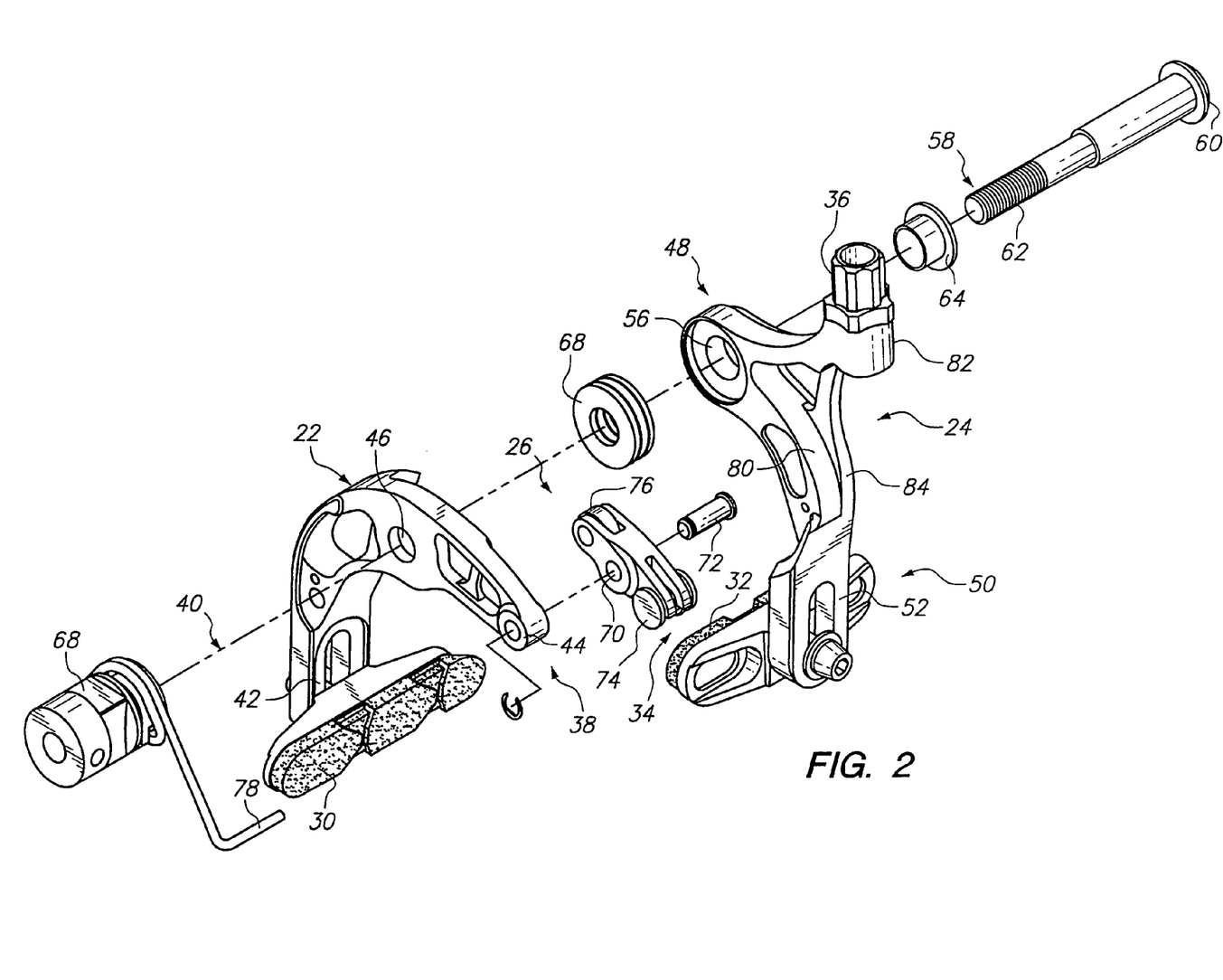
FIG. 2 is an exploded view of the brake illustrated in FIG. 1.

The invention will be described in more detail with reference to FIG. 2. As illustrated, the first arm 22 comprises a body having a first end 38 and a second end 40. The first arm 22 is generally arcuate between its ends 38,40. As illustrated, the first arm 22 extends upwardly (i.e. along a vertical line) from the second end 40 and arcs or bends inwardly to the first end 38 (which extends along a line which is generally perpendicular to the vertical line).

A pad mount 42 is defined at the second end 40 of the first arm 22. In one embodiment, the pad mount 42 comprises an aperture, such as a slotted opening, for a brake pad support. In one embodiment, the brake pad 30 comprises a pad member mounted to a base having a stem or support extending therefrom. The stem passes through the aperture comprising the pad mount 42. A nut or similar member may be utilized to tighten the brake pad 30 into a fixed position relative to the first arm 22. Of course, other means may be provided for mounting the brake pad 30 the first arm 42, whether in fixed or adjustable fashion.

In a preferred embodiment, a cam mount 44 is defined at the first end 38 of the first arm 22. In one embodiment, the cam mount 44 comprises an aperture.

Preferably, an arm mount or pivot 46 is defined between the first and second ends 38,40 of the first arm 22. In one embodiment, the arm mount 46 comprises an aperture.

The second arm 24 comprises a body also having a first end 48 and a second end 50. The second arm 24 is also generally arcuate between its ends 48,50. As illustrated, the second arm 24 extends upwardly from the second end 50 and arcs or bends inwardly to the first end 48.

A pad mount 52 is defined at the second end 50. This pad mount 52 may be similar to the pad mount 42 of the first arm 22. Preferably, an arm mount or pivot 56 is defined at the first end 48 of the second arm 24. In one embodiment, the arm mount 56 comprises an aperture.

Figure 1:
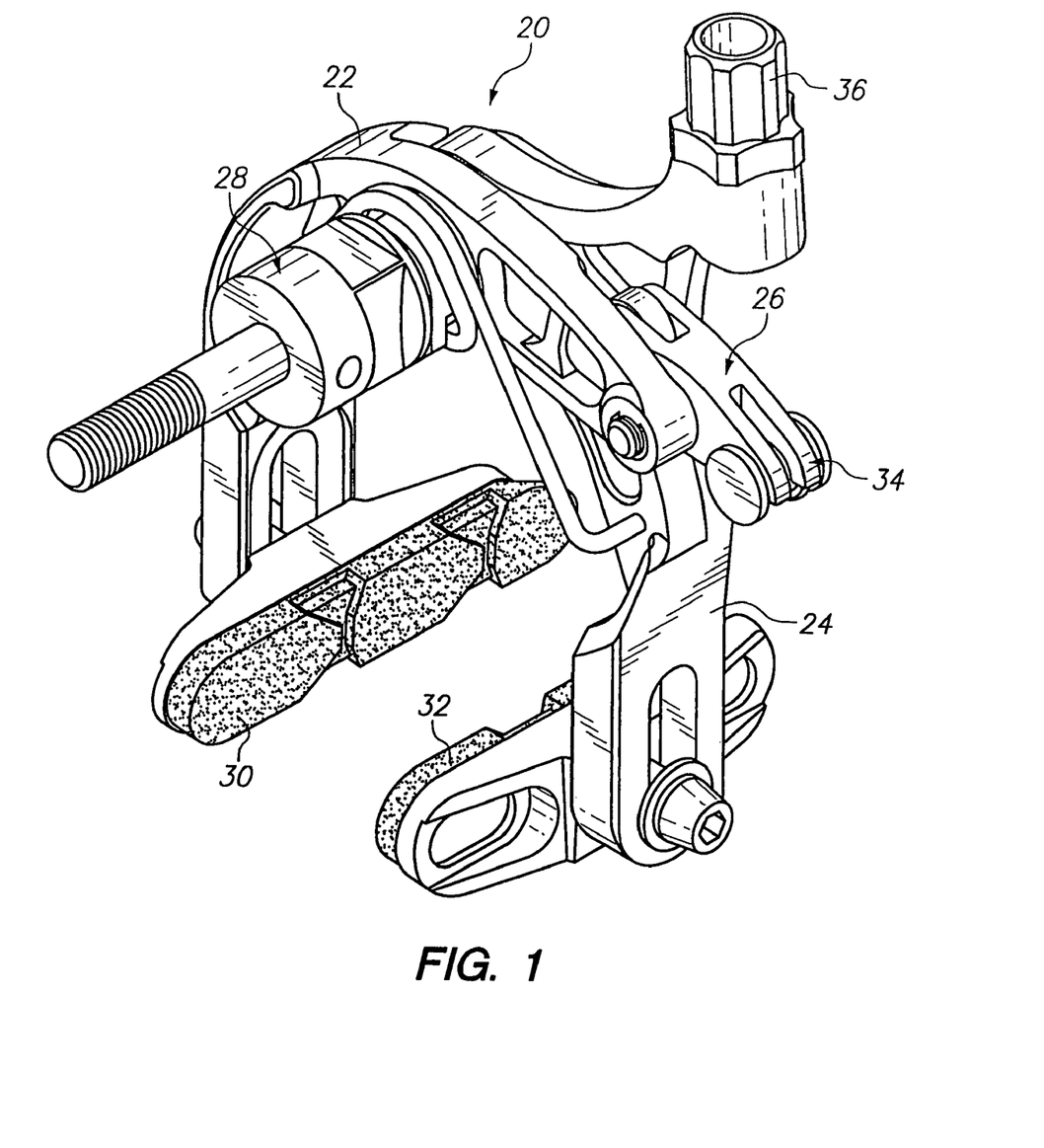
FIG. 1 is a perspective view of an assembled brake in accordance with one embodiment of the invention.

When assembled, as best illustrated in FIG. 1, the first and second arms 22,24 are preferably arranged in reverse orientation. In that orientation, the arm mounts 46,56 are located adjacent to one another and the arms 22,24 extend outwardly therefrom so that the brake pads 30, 32 are spaced apart from one another. As is known, the size of the arms 22,24 may depend upon the size of the wheel with which the brake 20 is to be utilized. In particular, the size of the arms 22,24 may vary to cause the brake pads 30,32 to be placed closer together or farther apart, depending upon the width of the wheel the brake is adapted to engage.

As illustrated, in one embodiment, the arms 22,24 are mounted by a mount 28. The mount 28 comprises one or more elements, including a pin 58. The pin 58 has a head 60 at one end and threads 62 at the other. In one embodiment, the pin 58 extends through a bushing 64 and through the arm mount 56 of the second arm 24, then through one or more washers 66, then through the arm mount 46 of the first arm 22 to a nut 68. The entire brake 20 may be mounted to a support, such as a bicycle frame, by the threaded end of the pin 58. Of course, the arms 22,24 might be mounted in other fashions. Regardless of the manner of mounting, the mounting preferably permits the first and second arms 22,24 to pivot relative to one another in a manner allowing the brake pads 30,32 towards and away from one another.

As illustrated, in one embodiment the first end 38 of the first arm 22 extends beyond the mount 28, and thus beyond the arm mount or pivot 56 of the second arm 24, towards the second end 50 thereof.

In a preferred embodiment, movement of the first and second arms 22,24 is effected by the cam 26. In one embodiment, the cam 26 has a first end, a second end, and a main or middle portion therebetween. Preferably, the cam 26 is mounted at the middle or intermediate portion between the ends, whereby the cam 26 may pivot. As illustrated, an aperture 70 is located between the first and second ends of the cam 26. A pin 72 preferably mounts the cam 26 to the first end 38 of the first arm 22, the pin 72 passing through the aperture 70 in the cam 26 and into the cam mount 44 of the first arm 22.

In one embodiment, the cam 26 defines a cable mount 34 at the second end thereof. As illustrated, the cable mount 34 may comprise slot in the second end of the cam 26 and a locking pin 74. The slot may be configured to accept a portion of an actuating cable therein, the pin 74 retaining the cable in the slot (preventing an end portion of the cable from pulling through the slot).

In a preferred embodiment, a roller 76 is located at the first end of the cam 26. In one embodiment, the roller 76 comprise a small wheel which is mounted for rotation with respect to a supporting portion of the cam 26.

In one embodiment, the roller 76 is configured to engage the second arm 24. As illustrated, the second arm 24 defines a sloping or arcuate cam surface 80. The cam surface 80 slopes upwardly and inwardly from the second end 50 of the second arm 24 towards the first end 48 thereof. As illustrated, in a preferred embodiment, the cam surface 80 is an arcuate top portion of the outer or exterior surface of the second arm 24, located between its first and second ends. In one embodiment, the cam surface 80 is located behind the upwardly extending cable mount portion of the second arm 24 and thus very close to the first arm 22.

The second arm 24 also defines a cable guide 82. In one embodiment, the cable guide 82 has an upwardly extending support 84. An adjuster 36 may be associated with the support 84. In one embodiment, the cam surface 80 is located behind the upwardly extending support 84.

Figure 3:
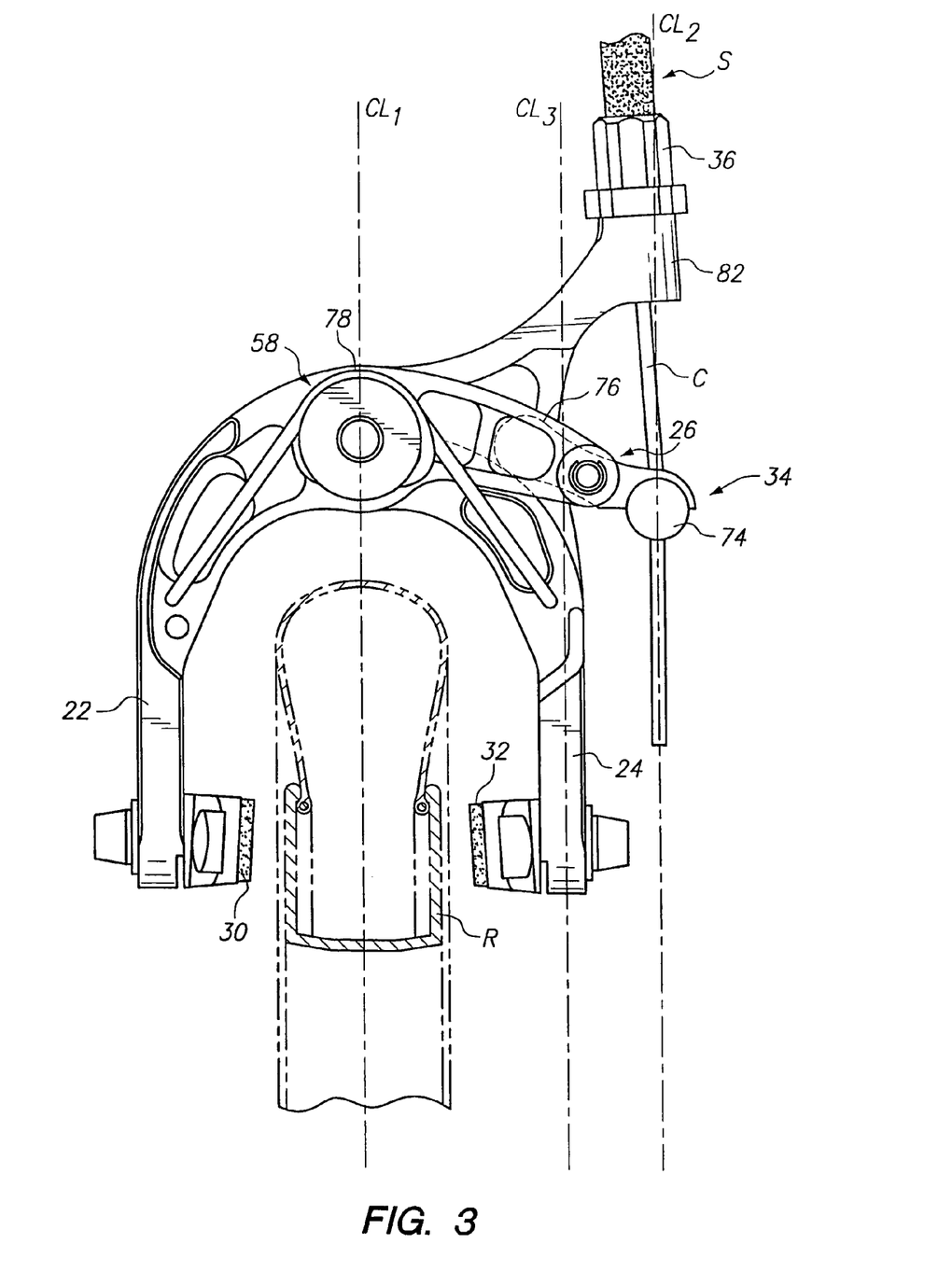
FIG. 3 is a rear plan view of the brake illustrated in FIG. 1 in an un-activated position.

The brake 20 preferably also includes at least one biasing member configured to bias the arms 22,24 apart from one another. In one embodiment, this comprises at least one spring 78. The spring 78 may be mounted to the nut 68 and be configured to engage each arm 22,24 in a manner causing the arms 22,24 to be biased outwardly. For example, opposing ends of the spring 78 may pass into mounting holes or apertures in each arm 22,24, as best illustrated in FIG. 3.

Additional aspects of the invention, including a method of operation, will now be described with reference to FIGS. 3 and 4. FIG. 3 illustrates the brake 20 of the invention as mounted on a bicycle frame (not shown), such that the brake pads 30,32 are located on either side of a bicycle wheel rim R.

An actuating cable C is connected to the brake 20. A first end of the cable C may be connected to a brake lever or similar actuating device (not shown). A second end of the cable C is connected to the brake 20. The cable C may extend through a shroud S which terminates at the adjuster 36. The cable C preferably extends from the shroud S through the cable support 82 of the second arm 24 to the cable mount at the second end of the cam 26. As indicated, a pin 74 may be used to connect the cable to the cam 26.

When the cable C is not actuated, the spring 78 biases the arms 22,24 apart from one another. At this time, the brake pads 30,32 are set away from the rim R of the bicycle wheel, allowing the bicycle wheel to freely rotate. As this time, the roller 76 of the cam 26 is positioned near the top of the cam surface 80 of the second arm 24.

Figure 4:
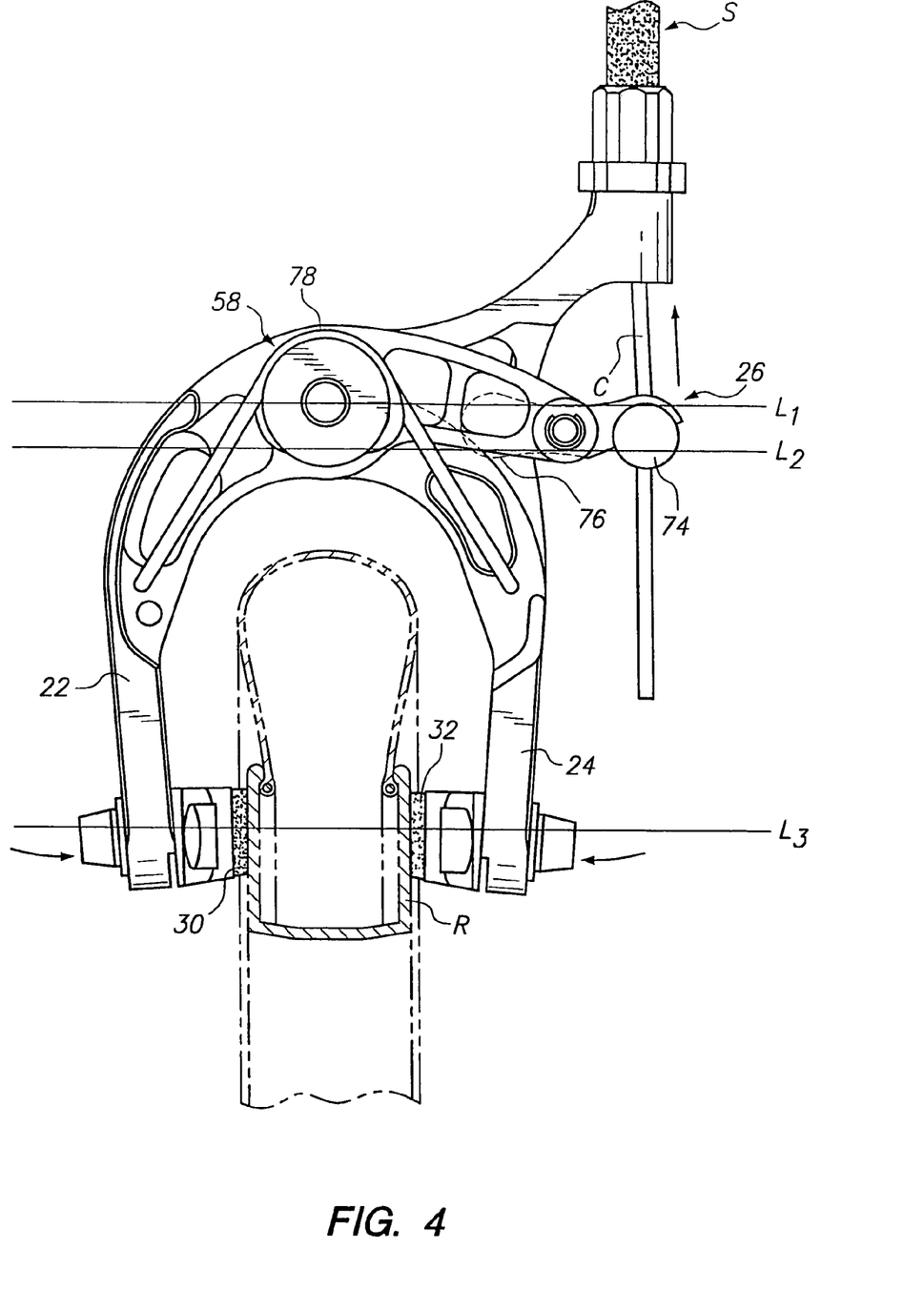
FIG. 4 illustrates the brake of FIG. 3 in an activated position.

Referring to FIG. 4, when the cable C is actuated, the cable C moves upwardly. The cable C pulls the second end of the cam 26 upwardly. Because the cam 26 is pivotally mounted (about the pin 72 connected to the first arm 22, as illustrated in FIG. 2), this causes the first end of the cam 26 to move downwardly.

Downward movement of the cam 26 is facilitated by the roller 76. In particular, the roller 76 moves along the cam surface 80 on the second arm 24. As this occurs, the first and second arms 22,24 are forced towards one another and thus inwardly towards the rim R (the force applied to the cable C is transferred through to the arms 22,24). As this occurs, the brake pads 30,32 engage the rim R of the wheel, effecting a braking force upon the wheel.

Once the cable C is released, the first and second arms 22,24 are moved away from one another and thus the rim R by the spring 78. In this manner, the brake 20 moves between a first, non-actuated position and a second, actuated position.

Figure 5:
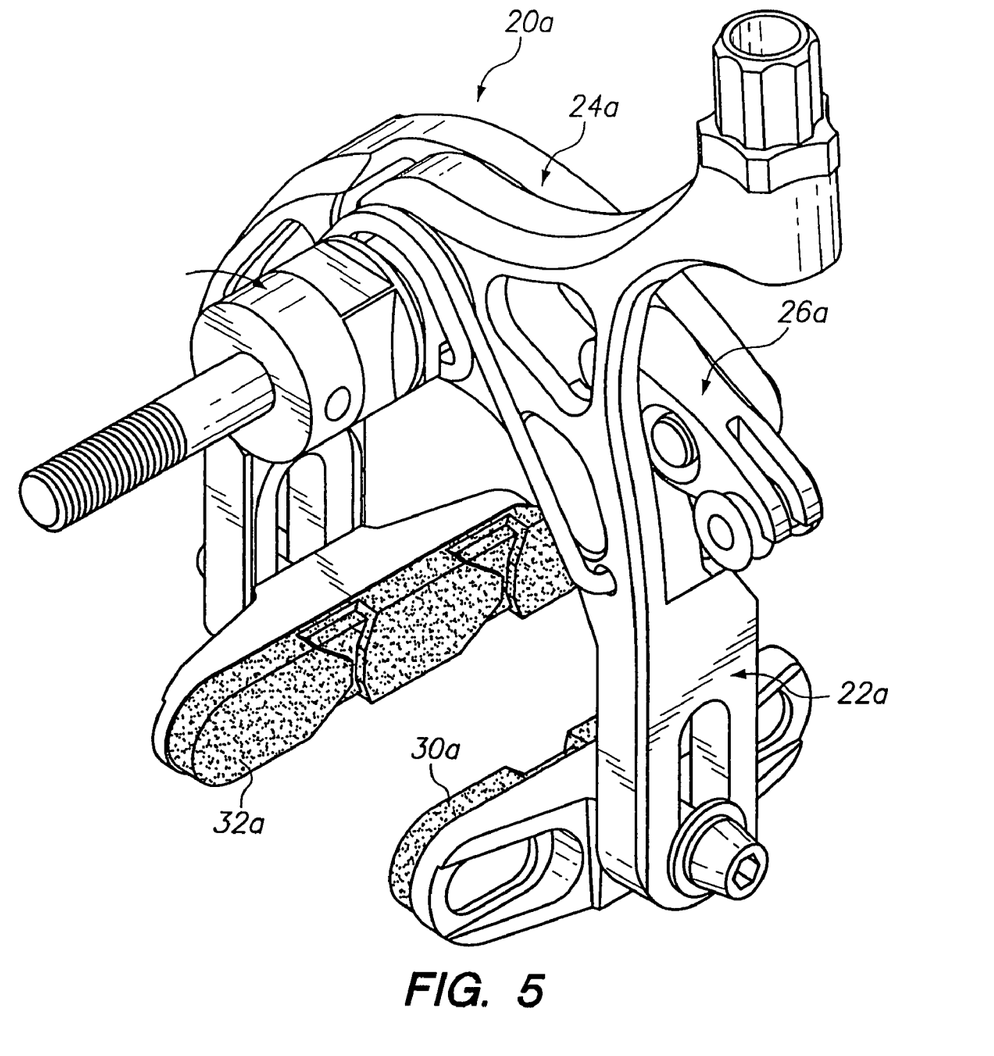
FIG. 5 is a perspective view of an assembled brake in accordance with another embodiment of the invention.

It will be appreciated that the brake of the invention may have a variety of other configurations. For example, in the embodiment illustrated, the first arm 22 is located behind the second arm 24. In other embodiments, a brake 20*a* may be configured so that the first arm 22*a* is located in front of the second arm 24*a*, as best illustrated in FIG. 5. In this configuration, the cam 26*a* is preferably still between the first and second arms 22*a,b*. Thus, the cam engaging surface 80*a* may be located on a front side of the second arm 22*b*, rather than a rear side as in the embodiment illustrated in FIG. 2. It is also possible for the brake to be designed such that the cam and cable mount are located on the opposing side of the brake (i.e. the orientation of the arms is reversed).

The components of the brake of the invention may be constructed from a variety of materials. Preferably, lightweight and durable materials are utilized. For example, the arms may be constructed or molded or machined aluminum, titanium or the like.

In one embodiment, the cam roller is constructed from metal. In other embodiments, the roller might be constructed from nylon or other material. Preferably, the cam roller is mounted on a pin, bearing or the like, facilitating free rotation thereof relative to the body of the cam. In other embodiments, the cam may not include a roller, but may merely define cam surface. That surface might, for example, be defined by a low friction material such as nylon. The cam might instead also have more than one roller or might have other moving cam surfaces, such as a roller ball, it being understood that the advantage of the moving surface (roller, etc.) is to minimize friction between the cam and the brake arm.

It is desired that the brake be small and aerodynamic in design. As such, as illustrated in FIG. 1, the size and shape of the arms 22,24 are chosen so that the arms have a cooperative shape. For example, the top of each arm 22,24 at the mount 28 is relatively smooth and at the same height, so as to reduce wind drag.

As illustrated, one or more weight reducing apertures or insets may be provided into the components of the brake. For example, each arm may have one or more apertures therein to reduce the total weight of the brake.

The invention has a number of advantages. First, the brake has few parts. This allows the brake to be simple in construction and lightweight.

Second, the brake is effective in generating a high braking force relative to the force applied by the cable. As detailed below, the configuration of the cam maximizes the lever-arm effective of the cable force upon the arms.

Third, the brake is configured so that the brake pad are moved inwardly and apply braking force uniformly (i.e. engage each side of the rim at the same time and apply an even braking force on each side). This overcomes problems associated with prior art brakes wherein a brake pad on one side engages the rim sooner than the brake pad on the other, forcing the wheel rim off center when the brake is engaged.

In one embodiment, particular benefits are realized by the configuration of the preferred embodiment of the invention.

First, significant advantages are realized by the cam having a pivot point between the cable attachment and the cam roller or engaging end of the cam. In this configuration, the length of the cam/lever can be minimized (thus minimizing the size of the brake and minimizing its weight) while still achieving maximum braking effect. This represents a significant advantage over other brake designs, including cam type designs such as that in U.S. Pat. No. 7,000,739, where the pivot point is at the end of the lever.

In a preferred embodiment, as illustrated in FIG. 3, the attachment point of the cable C to the cam 26 is in general vertical alignment with the cable mount 82, as along line CL2 as illustrated. Preferably, this line CL2 is no more than about 50% of the distance further from a centerline CL1 through the brake than a centerline CL3 through the main part of each arm. In this manner, the outermost portion of the cam 26 and the cable mount 82 do not extend outwardly far from the center of the brake 20, whereby the brake 20 has reduced dimension (which is important to weight, aerodynamics and other factors).

In one embodiment, the pivot point for the cam 26 is in general alignment with the second end of the second arm 24, once again contributing to a compact design for the brake 20. In a preferred embodiment, the pivot point for the cam 26 is positioned along a vertical line which is no more than 10 mm, and more preferably 7 mm or less, from a line extending along the outside of the vertical portion of the arm at the second end of the arm (i.e. the pivot is horizontally close to the arm).

In one embodiment, as best illustrated in FIG. 4, the arms 22,24 pivot about a point which lies along horizontal line L1. Preferably, the point of contact of the roller 76 is along a line L2 which is close to line L1. In one embodiment, line L2 is only about 10% of the distance from line L1 to a line L3 through the brake pads 30,32. As a result, the point where force is applied by the cam 26 to the second arm 24 is very close (vertically) to the pivot point of the arm. In this manner, force applied by the cable is effectively applied to the arm. Because the force is applied near the pivot point, the arms are moved inwardly at nearly the same rate, allowing for even braking force (as compared, for example, to a brake having force applied to the outside of just one arm).

As illustrated in FIG. 3, the angle of the cam 26 relative to horizontal is very small, such as +/−45 degrees, and more preferably +/−30 degrees or less, when the brake 20 is in the non-actuated position. In this manner, when a cable force is applied to the cam, the horizontal distance between the second end of the cam where the cable is mounted and the pivot point of the cam is maximized, and the cam is nearly level. This maximizes the "lever arm" force generated by the cam to the arms 22,24, thus generating maximum braking force relative to user-applied cable force.

In one embodiment, the angle of contact between the cam (such as the roller thereon) and the cam surface of the arm, is between +/−90 degrees (when considering the orthogonal contact line relative to horizontal).

In a preferred embodiment, the cam/lever engages a top, rather than side portion, of the arm. Further, the contact point is close to the pivot point of the arms. In this fashion, the brake is more compact (since the cam is positioned more towards the center of the brake) and, as detailed above, braking force is nearly equal for both arms.

In the preferred embodiment, the cam is pivotally mounted to one arm and engages a top portion of the other arm. However, the cam could be configured to engage the other arm in other fashions so as to effect movement thereof. For example, the roller of the cam could be replaced with an outwardly extending pin, which pin engages a slot in the engaged arm, rather than just the top outer surface thereof. Further, other components could be configured or mounted in other fashions. For example, instead of the cam being mounted by a pin extending through an aperture in the cam, the cam could simply include a pin or pins extending outwardly there from.

In another embodiment of the invention, the cam or lever need not be mounted to either arm of the brake. For example, in one embodiment, the cam might be mounted to or at the common pivot of the arms (such as the bolt 60), whereby the pivot point of the cam is the same as the arms. In this configuration, the cam portion of the cam or lever may be configured to engage either of the arms, thereby effecting movement thereof. Once again, the cam may engage the arm(s) by one or more rollers or the like.

This embodiment of the invention has the advantage that the first arm does not require an extended portion to serve as a mount for the cam. Once again, the cam is preferably actuated by a cable, and to accommodate the inward location of the cam, the cable may be mounted to the arm(s) in other locations and manners. For example, either arm might include a more centrally located cable mount (rather than the upwardly and outwardly extending cable mount 82 in the embodiment described above). The cable mount might in such case be a separate element from the arm(s) and might be associated therewith by bolts or other fasteners.

This embodiment of the invention has the advantage that the cam/lever not only does not extend far beyond the outside of the arm(s) the brake, it in fact can be located entirely within the arms of the brake. This allows the brake to be even more compact. In addition, the weight of the brake can be further reduced by eliminated the need for the arm extension for mounting the cam, and by reducing the size of the cable mount. At the same time, the cam can still be configured to engage a top outer surface of one of the arms, whereby braking action can be maintained in the manner detailed above.

One advantage of the brake of the invention is that the braking effect, including whether the braking force is linear or progressive, and the amount of lever action, can be easily modified. In particular, these effects can be modified by changing the orientation of the cam/lever, the distances between the pivot, roller and/or cable mount, and the point and angle of contact between the cam and the arm. In one embodiment, the brake may include various adjustments (such as a slot mount for the cam, thus permitting the pivot point of the cam to be altered).

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A rim brake for a vehicle having at least one wheel having a rim, comprising:
   a first arm having a first portion for connection of a brake pad thereto, a second portion and a pivot point between said first and second portions;
   a second arm having a first portion for connection of a brake pad thereto, a second portion for accepting a cable, and a pivot point, said second arm further defining a cam surface;
   a mount extending through said pivot points of said first and second arms; and
   a cam pivotally mounted to said first arm at a pivot point, said cam having a first end for connection to a cable and having a second end configured to engage said cam surface of said second arm, said pivot point located between said first end and said second end of said cam, said pivot point positioned along a first line which is adjacent a second line which is parallel to said first line and which extends through said mount.

2. The rim brake in accordance with claim 1 wherein at least one roller is located at said second end, said at least one roller configured to engage said cam surface of said second arm.

3. The rim brake in accordance with claim 1 wherein said cam is pivotally mounted to said second portion of said first arm.

4. The rim brake in accordance with claim 1 wherein said cam surface of said second arm comprises an outside surface of said arm.

5. The rim brake in accordance with claim 4 wherein said first portion of said second arm extends generally vertically and at least a portion of said second arm between said pivot and said first portion extends generally horizontally and said outside surface is located between said pivot point and said second portion of said second arm along said generally horizontal portion.

6. The rim brake in accordance with claim 1 wherein said cam extends substantially horizontally when in a non-actuated position.

7. The rim brake in accordance with claim 1 wherein said pivot point of said cam is positioned along a first vertical line which is no more than about 10 mm horizontally from a second vertical line extending along an outside portion of said second arm.

8. The brake in accordance with claim 1 wherein said pivot point of said cam is no more than about 7-10 mm horizontally outwardly from said second arm.

9. The brake in accordance with claim 1 wherein said cam contacts said second arm at a contact angle of between about 15 to 90 degrees.

10. The brake in accordance with claim 1 wherein said first end of said cam extends outwardly of said second arm no more than about 50 percent of a distance from a vertical line extending through said mount to a vertical line extending through said first end of said second arm.

11. The brake in accordance with claim 1 wherein said first and second arms pivot about a common pivot and said second end of said second arm is located at said common pivot.

12. A brake for a rotating wheel of a vehicle comprising:
   a first arm having a first end for connection of a brake pad thereto, an opposing second end, and a pivot point between said first and second ends, said first arm being arcuate between said first and second ends;
   a second arm having a first end for connection of a brake pad thereto, an opposing second end and a pivot point, said second arm being arcuate between said first and second ends and said second arm further defining a cam surface, said second arm defining a cable guide;
   a mount extending through said pivot points of said first and second arms, said first and second arms mounted so that said first end of said first arm and said second end of said second arm is located on opposing sides of said mount, permitting said first and second arms to move relative to one another; and
   a cam having a first end for connection to a cable, a second end configured to engage said cam surface of said second arm, and mounted to said second end of said first arm at a pivot point of said cam located between said first end and said second end of said cam, wherein said pivot point of said cam is in substantial horizontal alignment with said mount and wherein said first end of said cam at which a cable may be connected and said cable guide of said second arm are in substantial vertical alignment.

13. the brake in accordance with claim 12 wherein said second end of said cam is located vertically below said cable guide.

14. The brake in accordance with claim 12 further including a brake pad mounted to each of said first end of said first arm and said first end of said second arm.

15. The brake in accordance with claim 12 wherein at least one roller is mounted to said second end of said cam.

16. The brake in accordance with claim 12 wherein said cam surface comprises an outer surface of said arcuate portion of said second arm.

17. The brake in accordance with claim 12 wherein said cam surface comprises a generally horizontal portion of said second arm between said second end of said second arm and said pivot point of said second arm.

18. The brake in accordance with claim 12 wherein said cam surface comprises a top surface of said second arm.

19. The brake in accordance with claim 12 wherein said pivot point of said second arm is located at said second end thereof.

20. The brake in accordance with claim 12 wherein said first end of said first arm and said first end of said second arm are spaced from one another, and wherein said second end of said first arm overlaps said second arm beyond said pivot point of said second arm.

* * * * *